(12) United States Patent
Hayashida et al.

(10) Patent No.: US 10,524,051 B2
(45) Date of Patent: Dec. 31, 2019

(54) SOUND SOURCE DIRECTION ESTIMATION DEVICE, SOUND SOURCE DIRECTION ESTIMATION METHOD, AND RECORDING MEDIUM THEREFOR

(71) Applicant: Panasonic Corporation, Osaka (JP)

(72) Inventors: Kohhei Hayashida, Kyoto (JP); Takeo Kanamori, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/368,147

(22) Filed: Mar. 28, 2019

(65) Prior Publication Data

US 2019/0306620 A1    Oct. 3, 2019

Related U.S. Application Data

(60) Provisional application No. 62/649,751, filed on Mar. 29, 2018.

(30) Foreign Application Priority Data

Dec. 4, 2018  (JP) ................................ 2018-227318

(51) Int. Cl.
*H04R 3/00* (2006.01)
*G10L 25/00* (2013.01)
(Continued)

(52) U.S. Cl.
CPC .............. *H04R 3/005* (2013.01); *G10L 25/30* (2013.01); *G10L 25/78* (2013.01); *H04R 1/406* (2013.01)

(58) Field of Classification Search
CPC . H04R 3/00; H04R 3/005; H04R 3/04; H04R 3/12; H04R 1/265; H04R 1/406;
(Continued)

(56) References Cited

U.S. PATENT DOCUMENTS

2008/0040101 A1* 2/2008 Hayakawa ............. H04R 3/005
704/203
2012/0179458 A1* 7/2012 Oh ....................... G10L 21/0208
704/203

(Continued)

FOREIGN PATENT DOCUMENTS

JP           2002-186084           6/2002

*Primary Examiner* — Thang V Tran
(74) *Attorney, Agent, or Firm* — Wenderoth, Lind & Ponack, L.L.P.

(57) ABSTRACT

A sound source direction estimation device includes: a phase difference calculator which calculates, from an acoustic signal obtained by a microphone array, a first phase difference of a pair of microphone units; a similarity calculator which calculates similarities between the calculated first phase difference and second phase differences precalculated for directions and stored in a phase difference database; a peak searcher which searches for a direction for which a highest similarity is calculated by the similarity calculator, and estimates the direction searched out to be a sound source direction; a feature quantity calculator which uses the calculated similarities, the estimated sound source direction, and an acoustic feature quantity obtained from the obtained acoustic signal, to calculate a feature quantity obtained by correcting the acoustic feature quantity; and a speech/non-speech determiner which determines whether the obtained acoustic signal indicates speech, using the feature quantity calculated by the feature quantity calculator.

7 Claims, 11 Drawing Sheets

(51) Int. Cl.
*G10L 25/30* (2013.01)
*G10L 25/78* (2013.01)
*H04R 1/40* (2006.01)

(58) Field of Classification Search
CPC ...... H04R 1/32; H04R 1/326; H04R 2430/20; G10L 2021/02166; G10L 25/03; G10L 25/30; G10L 25/51; G10L 25/78; G10L 25/84; G10L 25/87; G10L 25/90; G10L 21/02; G10L 21/0208; G10L 21/0232; G10L 15/08; G10L 15/20
See application file for complete search history.

(56) References Cited

U.S. PATENT DOCUMENTS

| | | | | |
|---|---|---|---|---|
| 2012/0239394 | A1* | 9/2012 | Matsumoto | G10L 25/84 704/233 |
| 2013/0030801 | A1* | 1/2013 | Fallat | H04R 3/005 704/226 |
| 2015/0245152 | A1* | 8/2015 | Ding | H04R 1/406 381/56 |
| 2016/0203828 | A1* | 7/2016 | Gomez | G10L 15/20 704/226 |
| 2016/0379614 | A1* | 12/2016 | Matsumoto | G10L 21/0232 381/94.3 |
| 2017/0287501 | A1* | 10/2017 | Matsumoto | G10L 21/0232 |

* cited by examiner

SOUND SOURCE DIRECTION ESTIMATION DEVICE, SOUND SOURCE DIRECTION ESTIMATION METHOD, AND RECORDING MEDIUM THEREFOR

CROSS REFERENCE TO RELATED APPLICATIONS

This application claims the benefit of priority of U.S. Provisional Patent Application No. 62/649,751 filed on Mar. 29, 2018 and Japanese Patent Application Number 2018-227318 filed on Dec. 4, 2018, the entire contents of which are hereby incorporated by reference.

BACKGROUND

1. Technical Field

The present disclosure relates to a sound source direction estimation device, a sound source direction estimation method, and a recording medium therefor.

2. Description of the Related Art

As a tool for speakers of different languages to communicate with each other, there has been a speech translation device which translates the speech of one of the speakers into the language of the other speaker and vice versa. However, such a speech translation device often fails to correctly recognize speech of a speaker due to the influence of noise in a noisy environment, and thus fails to correctly translate the speech.

For example, Japanese Unexamined Patent Application Publication No. 2002-186084 discloses a technology of extracting speech with high quality, by estimating the direction of a speaker and suppressing noise in a direction other than the direction of the speaker, in order to obtain speech of the speaker with high quality in a noisy environment.

SUMMARY

However, according to the technology disclosed by Japanese Unexamined Patent Application Publication No. 2002-186084, the direction of a speaker is estimated and then noise suppression processing is performed, which results in an increase in the amount of computation.

The present disclosure has been conceived in view of the above circumstances, and provides a sound source direction estimation device a sound source direction estimation method which can accurately perform speech determination in a noisy environment while inhibiting an increase in the amount of computation, and a recording medium for the sound source direction estimation method.

A sound source direction estimation device according to an aspect of the present disclosure includes: a phase difference calculator which calculates, from an acoustic signal obtained by a microphone array which includes at least two microphone units, a first phase difference of at least one pair of microphone units among the at least two microphone units; a similarity calculator which calculates similarities between the first phase difference calculated by the phase difference calculator and second phase differences of the at least one pair of microphone units precalculated for directions within a predetermined direction range when sound sources are assumed to be present in the directions, the second phase differences being stored in a phase difference database; a peak searcher which searches for a direction for which a highest similarity of the similarities is calculated by the similarity calculator, and estimates the direction searched out to be a sound source direction; a feature quantity calculator which uses at least one of the similarities calculated by the similarity calculator, the sound source direction estimated by the peak searcher, and an acoustic feature quantity obtained from the acoustic signal obtained by the microphone array, to calculate a feature quantity obtained by correcting the acoustic feature quantity; and a speech determiner which determines whether the acoustic signal obtained by the microphone array indicates speech, using the feature quantity calculated by the feature quantity calculator.

Note that specific aspects of the above may be partially implemented using a system, a method, an integrated circuit, a computer program, or a computer-readable recording medium such as a CD-ROM, or any combination of systems, methods, integrated circuits, computer programs, or computer-readable recording media.

The present disclosure can achieve a sound source direction estimation device which can accurately distinguish speech in a noisy environment while inhibiting an increase in the amount of computation.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
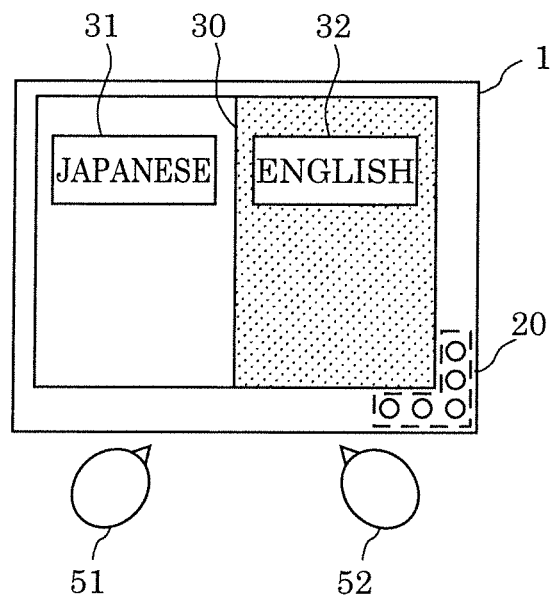
FIG. 1 illustrates an example of the external appearance of a speech translation device according to an embodiment.

A sound source direction estimation device according to an aspect of the present disclosure includes: a phase difference calculator which calculates, from an acoustic signal obtained by a microphone array which includes at least two microphone units, a first phase difference of at least one pair of microphone units among the at least two microphone units; a similarity calculator which calculates similarities between the first phase difference calculated by the phase difference calculator and second phase differences of the at least one pair of microphone units precalculated for directions within a predetermined direction range when sound sources are assumed to be present in the directions, the second phase differences being stored in a phase difference database; a peak searcher which searches for a direction for which a highest similarity of the similarities is calculated by the similarity calculator, and estimates the direction searched out to be a sound source direction; a feature quantity calculator which uses at least one of the similarities calculated by the similarity calculator, the sound source direction estimated by the peak searcher, and an acoustic feature quantity obtained from the acoustic signal obtained by the microphone array, to calculate a feature quantity obtained by correcting the acoustic feature quantity; and a speech determiner which determines whether the acoustic signal obtained by the microphone array indicates speech, using the feature quantity calculated by the feature quantity calculator.

According to this configuration, by using a feature quantity obtained by correcting an acoustic feature quantity using the result obtained by the processing of estimating the sound source direction, whether the acoustic signal indicates speech can be more accurately determined even in a noisy environment while inhibiting an increase in the amount of computation, when compared to the case where an acoustic feature quantity is used. Thus, this configuration can achieve a sound source direction estimation device which can accurately perform speech determination in a noisy environment while inhibiting an increase in the amount of computation.

Here, for example, the sound source direction estimation device may further include: a time average calculator which obtains a plurality of sets of the similarities at time points calculated by the similarity calculator, and calculates, per predetermined period, a time-averaged similarity by averaging similarities in the predetermined period among the plurality of sets of the similarities at the time points. The peak searcher may search for a direction for which a highest time-averaged similarity of the time-averaged similarities is calculated by the time average calculator, as the direction for which the highest similarity is calculated.

Accordingly, the sound source direction is estimated from the time-averaged similarity, thus more reliably estimating the direction of a speaker (hereinafter, referred to as a speech direction) as the sound source direction. Accordingly, when an acoustic signal indicates speech, a feature quantity on which a feature of speech is more reflected can be used, and thus the accuracy of speech determination in a noisy environment can be further improved.

For example, the speech determiner may determine whether the acoustic signal obtained by the microphone array indicates speech, from the feature quantity calculated by the feature quantity calculator, using a neural network which includes a plurality of layers.

According to this configuration, a neural network can be caused to accurately learn speech determination for a large amount of patterns of feature quantities obtained by correcting acoustic feature quantities according to noisy environments, and thus the accuracy of speech determination in a noisy environment can be further improved.

For example, the feature quantity calculator may weight the acoustic feature quantity to increase a value of a portion of the acoustic feature quantity with decrease in distance between the portion and the sound source direction estimated by the peak searcher, based on at least one of the similarities calculated by the similarity calculator, compress dimensionality of the acoustic feature quantity weighted using a mel filter bank, and calculate, as the feature quantity, differences between. (i) the acoustic feature quantity weighted and compressed and (ii) weighted and compressed acoustic feature quantities obtained at discrete time points in past.

Accordingly, speech determination can be accurately performed in a noisy environment, while further inhibiting an increase in the amount of computation.

For example, the sound source direction estimation device may further include: a frequency distribution calculator which calculates frequencies of a plurality of the sound source directions estimated by the peak searcher in a predetermined period during which the speech determiner determines that a plurality of the acoustic signals obtained by the microphone array indicate speech, and outputs, among the plurality of sound source directions, a sound source direction having a frequency that exceeds a threshold among the frequencies calculated, as a sound source direction truly estimated by the sound source direction estimation device.

Accordingly, the speech direction can be estimated more reliably as the sound source direction.

A sound source direction estimation method according to an aspect of the present disclosure includes: (a) calculating, from an acoustic signal obtained by a microphone array which includes at least two microphone units, a first phase difference of at least one pair of microphone units among the at least two microphone units; (b) calculating similarities between the first phase difference calculated in (a) and second phase differences of the at least one pair of microphone units precalculated for directions within a predetermined direction range when sound sources are assumed to be present in the directions, the second phase differences being stored in a phase difference database; (c) searching for a direction for which a highest similarity of the similarities is calculated in (b), and estimating the direction searched out to be a sound source direction; (d) using at least one of the similarities calculated in (b), the sound source direction estimated in (c), and an acoustic feature quantity obtained from the acoustic signal obtained by the microphone array, to calculate a feature quantity obtained by correcting the acoustic feature quantity; and (e) determining whether the acoustic signal obtained by the microphone array indicates speech, using the feature quantity calculated in (d).

A recording medium according to an aspect of the present disclosure is a non-transitory computer-readable recording medium having a program recorded thereon for causing a computer to execute: (a) calculating, from an acoustic signal obtained by a microphone array which includes at least two microphone units, a first phase difference of at least one pair of microphone units among the at least two microphone units; (b) calculating similarities between the first phase difference calculated in (a) and second phase differences of the at least one pair of microphone units precalculated for directions within a predetermined direction range when sound sources are assumed to be present in the directions, the second phase differences being stored in a phase difference database; (c) searching for a direction for which a highest similarity of the similarities is calculated in (b), and estimating the direction searched out to be a sound source direction; (d) using at least one of the similarities calculated in (b), the sound source direction estimated in (c), and an acoustic feature quantity obtained from the acoustic signal obtained by the microphone array, to calculate a feature quantity obtained by correcting the acoustic feature quantity; and (e) determining whether the acoustic signal obtained by the microphone array indicates speech, using the feature quantity calculated in (d).

Note that some of the specific aspects may be implemented using a system, a method, an integrated circuit, a computer program, or a computer-readable recording medium such as a CD-ROM, or any combination of systems, methods, integrated circuits, computer programs, or recording media.

The following specifically describes a speech translation device according to an aspect of the present disclosure with reference to the drawings. The embodiments described below each show a specific example of the present disclosure. The numerical values, shapes, materials, elements, and the arrangement of the elements, for instance, described in the following embodiments are mere examples, and thus are not intended to limit the present disclosure. Among the elements in the following embodiments, elements not recited in any of the independent claims defining the most generic part of the inventive concept are described as arbitrary elements. Features of the embodiments can be combined.

Embodiment

<Overview>

Figure 2:
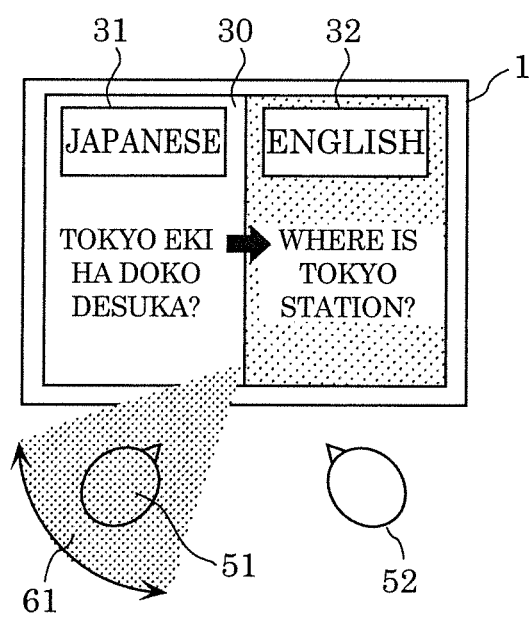
FIG. 2 illustrates an example of a situation in which the speech translation device according to the embodiment is used.
Figure 3:
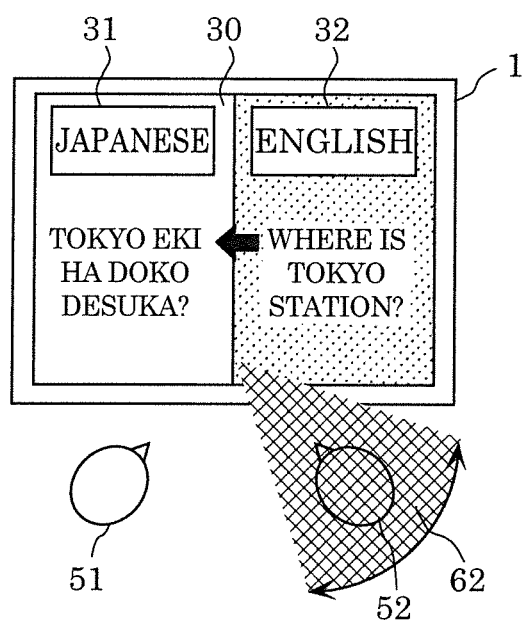
FIG. 3 illustrates an example of a situation in which the speech translation device according to the embodiment is used.

FIG. 1 illustrates an example of the external appearance of speech translation device 1 according to the present embodiment. FIGS. 2 and 3 illustrate examples of a situation in which speech translation device 10 according to the present embodiment is used.

Speech translation device 1 translates a conversation between first speaker 51 of a first language and second speaker 52 of a second language. Specifically, speech translation device 1 is used by two speakers of different languages, and translates the languages bidirectionally. Such speech translation device 1 has an elongated shape like a card, for example, and is achieved by a single mobile terminal such as a tablet terminal. As illustrated in FIG. 1, speech translation device 1 includes microphone array 20 which includes a plurality of microphones which obtain spoken words, and display area 30 for displaying a translation result in text.

FIG. 1 illustrates an example in which first speaker 51 of the first language that is Japanese is on the left, second speaker 52 of the second language that is English is on the right, and the speakers are having a conversation using speech translation device 1 side by side.

When first speaker 51 of Japanese speaks, first speaker 51 presses button 31 indicating "JAPANESE" and speaks. Here, for example, first speaker 51 says "TOKYO EKI HA DOKO DESUKA?" after pressing button 31 indicating "JAPANESE". In this case, as illustrated in FIG. 2, "TOKYO EKI HA DOKO DESUKA?" which is the result of the recognition of the Japanese words is displayed in the left region of display area 30, and "WHERE IS TOKYO STATION?" which is the result of translation into English by speech translation device 1 is displayed in the right region of display area 30. In the present embodiment, the directivity for picking up sound is directed in sound pickup direction 61 which is a direction in which first speaker 51 is positioned when viewed from speech translation device 1. The range of sound pickup direction 61 indicated by the double-pointed arrow may be changed according to the direction of first speaker 51 estimated as a sound source direction. Accordingly, speech determination can be accurately performed also in a noisy environment, and thus speech translation device 1 is allowed to correctly recognize speech of first speaker 51, and correctly translate the speech.

Similarly, when second speaker 52 of English speaks, second speaker 52 presses button 32 indicating "ENGLISH" and speaks. Here, after pressing button 32 indicating "ENGLISH", second speaker 52 says "WHERE IS TOKYO STATION?", for example. In this case, as illustrated in FIG. 3, "WHERE IS TOKYO STATION?" which is the result of the recognition of the English words is displayed in the right region of display area 30, and "TOKYO EKI HA DOKO DESUKA?" which is the result of translation into Japanese by speech translation device 1 is displayed in the left region of display area 30. In the present embodiment, the directivity for picking up sound is directed in sound pickup direction 62 which is a direction in which second speaker 52 is positioned when viewed from speech translation device 1. The range of sound pickup direction 62 indicated by the double-pointed arrow may be changed according to the direction of second speaker 52 estimated as a sound source direction. Accordingly, speech determination can be accurately performed also in a noisy environment, and thus speech translation device 1 is allowed to correctly recognize speech of second speaker 52, and correctly translate the speech.

Accordingly, speech translation device 1 switches between the first language and the second language to select a language into which spoken words are translated according to a user button operation, for instance. More specifically, when a user button operation, for instance, is received, speech translation device 1 estimates the direction of a speaker using microphone array 20 and directs directivity in the estimated direction of a speaker, to switch between sound pickup direction 61 and sound pickup direction 62. Accordingly, speech translation device 1 can extract speech of a speaker with high quality, and thus can more correctly recognize and translate speech. Here, speech translation device 1 may switch between sound pickup direction 61 and sound pickup direction 62, and also narrow switched sound pickup direction 61 or sound pickup direction 62 into a predetermined direction range that includes the estimated direction of a speaker. Irrespective of which of button 31 and button 32 is operated, speech translation device 1 may switch between languages into which speech is translated, according to the estimated direction of a speaker.

Note that display 30 included in speech translation device 1 according to the present embodiment has an elongated shape. Display 30 is used in a vertical or horizontal orientation.

Figure 4A:
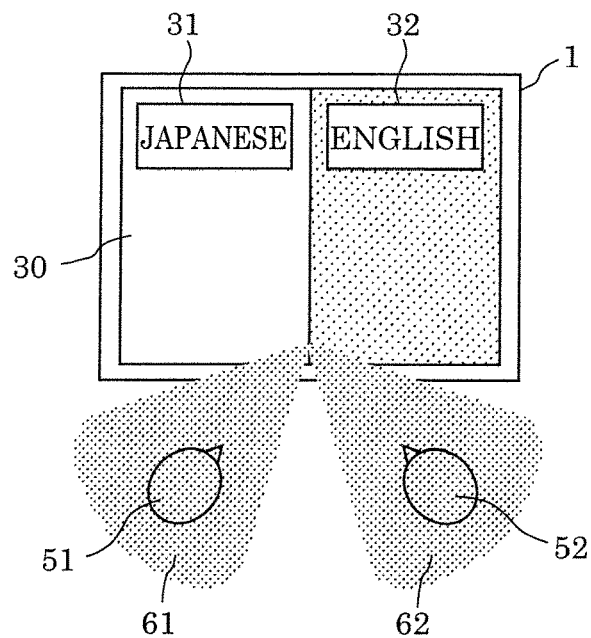
FIG. 4A illustrates a positional relationship of users using the speech translation device according to the embodiment.
Figure 4B:
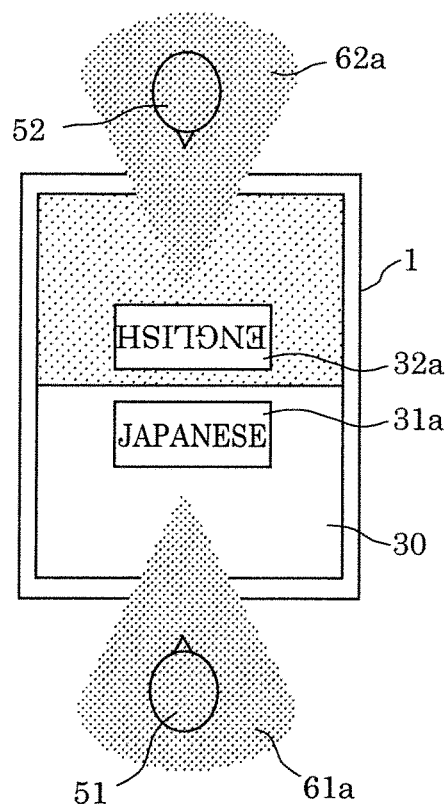
FIG. 4B illustrates a positional relationship of users using the speech translation device according to the embodiment.

FIGS. 4A and 4B illustrate the positional relationship of users of speech translation device 1 according to the present embodiment. The same numerals are given to the same elements as those in FIGS. 1 to 3, and a detailed description thereof is omitted.

As illustrated in FIG. 4A, when users, namely first speaker 51 and second speaker 52 use speech translation device 1 side by side, the users use speech translation device 1 with display area 30 in the horizontal orientation. On the other hand, as illustrated in FIG. 4B, when users, namely first speaker 51 and second speaker 52 use speech translation device 1, facing each other, the users use speech translation device 1 with display area 30 in the vertical orientation. In this case, button 31a indicating "JAPANESE" is displayed towards first speaker 51, and button 32a indicating "ENGLISH" is displayed towards second speaker 52. Speech translation device 1 directs the directivity of microphone array 20 in sound pickup direction 61a for first speaker 51 and in sound pickup direction 62a for second speaker 52.

<Configuration of Device>

Figure 5:
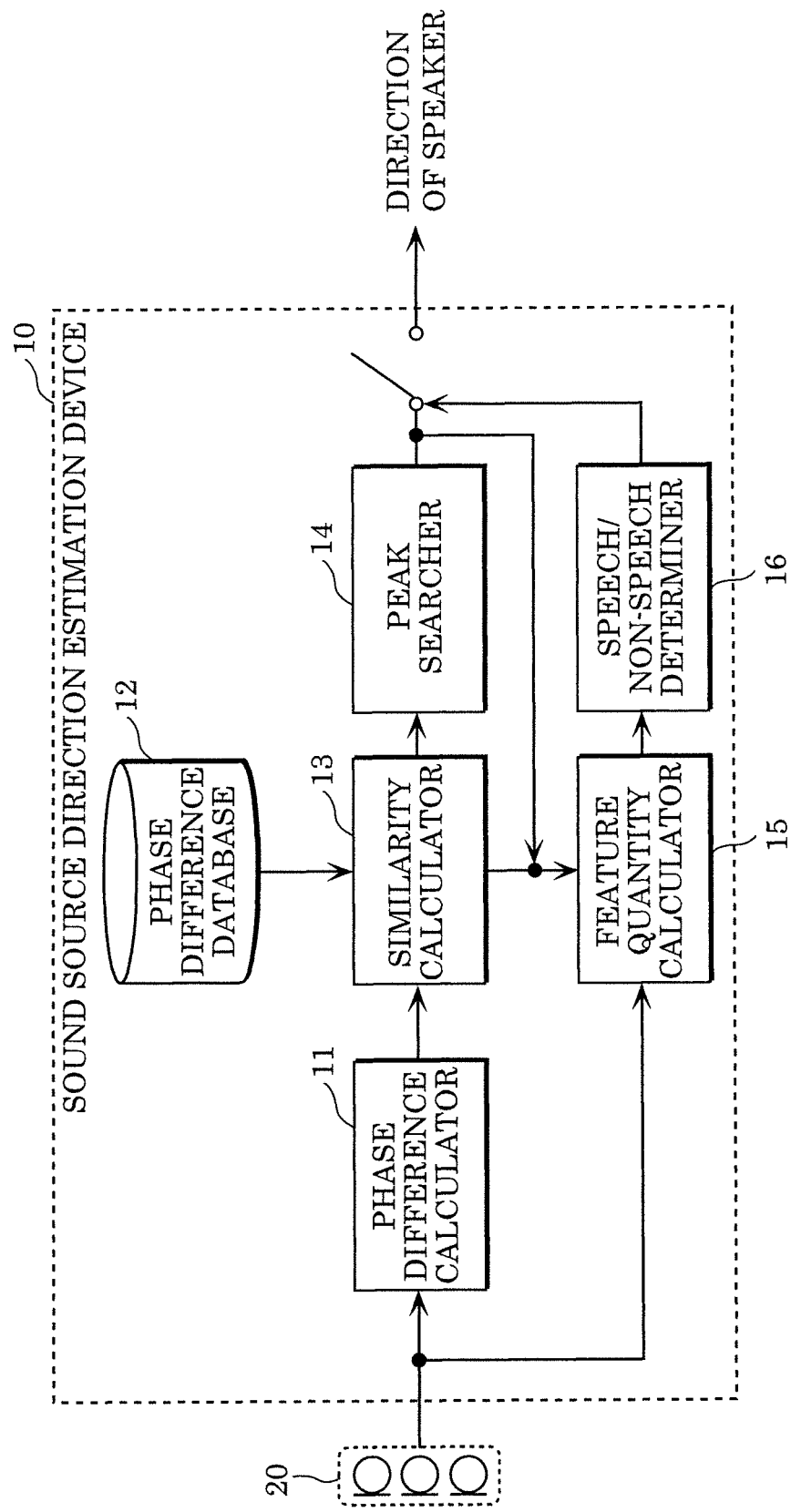
FIG. 5 illustrates an example of a configuration of a sound source direction estimation device according to the embodiment.

FIG. 5 illustrates an example of a configuration of sound source direction estimation device 10 according to the present embodiment.

Sound source direction estimation device 10 may function, being included in speech translation device 1 described above. As illustrated in FIG. 5, sound source direction estimation device 10 includes phase difference calculator 11, phase difference database 12, similarity calculator 13, peak searcher 14, feature quantity calculator 15, and speech/non-speech determiner 16. Sound source direction estimation device 10 may further include microphone array 20. Stated differently, sound source direction estimation device 10 does not necessarily include microphone array 20.

[Microphone Array 20]

Microphone array 20 obtains an acoustic signal. More specifically, microphone array 20 includes at least two microphone units spaced apart from one another, picks up sound waves, and obtains an acoustic signal resulting from conversion of the picked up sound waves into electrical signals. Note that microphone array 20 may be achieved as an adapter. In this case, microphone array 20 functions, being attached to sound source direction estimation device 10.

In the present embodiment, microphone array 20 includes M microphone units (M is a natural number of two or more), for example. The m-th microphone unit obtains acoustic signal resulting from conversion of a picked up sound wave into an electrical signal. Here, ω denotes a discrete frequency, and acoustic signal $x_{\omega,m}$ can be expressed as indicated by Expression 1. $|x_{\omega,m}|$ denotes an amplitude of acoustic signal $x_{\omega,m}$, $\exp(-j\omega\tau_m)$ denotes a phase of acoustic signal $x_{\omega,m}$ with delay $\tau_m$.

$$x_{\omega,m} = |x_{\omega,m}| \cdot \exp(-j\omega\tau_m) \quad \text{(Expression 1)}$$

[Phase Difference Calculator 11]

Phase difference calculator 11 calculates a first phase difference of at least one pair of microphone units among the at least two microphone units from an acoustic signal obtained by microphone array 20.

In the present embodiment, phase difference calculator 11 calculates, from an acoustic signal obtained by microphone array 20, a first correlation matrix ($R_\omega$) that indicates phase differences of pairs of microphone units, that is, phase differences between acoustic signals. More specifically, phase difference calculator 11 calculates first correlation matrix $R_\omega$ using Expression 3 below, using phase $A\omega$ of signal $X_\omega$ resulting from conversion of acoustic signal $X_\omega$ obtained by microphone array 20 into a frequency domain, which is indicated by Expression 2 below. In Expression 3, H denotes complex conjugate transpose.

[Math. 1]

$$A_\omega = \left[\frac{X_{\omega,1}}{|X_{\omega,1}|} \cdots \frac{X_{\omega,M}}{|X_{\omega,M}|}\right]^T = [\exp(-j\omega\tau_1) \cdots \exp(-j\omega\tau_M)]^T \quad \text{(Expression 2)}$$

[Math. 2]

$$R_\omega = A_\omega A_\omega^H = \begin{bmatrix} 1 & \cdots & \exp(-j\omega(\tau_1 - \tau_M)) \\ \vdots & \ddots & \vdots \\ \exp(-j\omega(\tau_M - \tau_1)) & \cdots & 1 \end{bmatrix} \quad \text{(Expression 3)}$$

The elements of first correlation matrix $R_1$, correspond to stored phase difference information of sound waves present in the real environment, which reach the microphone units.

[Phase Difference Database 12]

Phase difference database 12 stores second phase differences of at least one pair of microphone units of microphone array 20 precalculated for directions within a predetermined direction range, when sound sources are assumed to be present in the directions. Phase difference database 12 includes a hard disk drive (HDD) or a memory, for example.

In the present embodiment, phase difference database 12 prestores a plurality of second correlation matrices calculated for directions from the array arrangement of microphone array 20. More specifically, assuming that a sound source is present in a certain direction, a direction vector indicating a relation of a phase difference between sound waves received by at least one pair of microphone units of microphone array 20 is precalculated and stored in phase difference database 12. Note that a direction vector may be measured and obtained using the actual casing on which microphone array 20 is disposed, in order to take into consideration the influence of reflection and diffraction of sound waves by the casing. For example, sound source S which emits white noise having components in the entire frequency band is prepared first. Next, microphone array 20 picks up sound, and signal $S_m$ converted into a frequency domain is obtained. Then, using Expressions 4 and 5 below, direction vector $d\omega(\theta, \varphi)$ may be calculated, taking into consideration the influence exerted onto the casing when the sound source direction has horizontal angle θ and elevation angle φ.

[Math. 3]

$$d_\omega(\theta, \phi) = [H_{\omega,1}(\theta, \phi) \cdots H_{\omega,M}(\theta, \phi)]^T \quad \text{(Expression 4)}$$

[Math. 4]

$$H_{\omega,m}(\theta, \phi) = \sum_{l=0}^{L} \frac{S_{\omega,l}}{S_{\omega,m,l}(\theta, \phi)} \quad \text{(Expression 5)}$$

Here, $S_{\omega,l}$ and $S_{\omega,m,l}(\theta, \varphi)$ denote sound source S of the l-th frame, and a signal obtained by the m-th microphone unit picking up sound and being converted into a frequency domain, respectively. L denotes the number of frames used for averaging. Among sound source directions (θ, φ), direction θ denotes the horizontal direction and direction φ denotes the direction defined by an elevation angle.

Note that direction θ may be 0 to 180 degrees when speech translation device 1 is used with display 30 in the horizontal orientation, and may be 0 to 360 degrees when speech translation device 1 is used with display 30 in the vertical orientation. The above predetermined direction range may be 0 to 180 degrees or 0 to 360 degrees. Direction φ may be 10, 20, or 30 degrees.

[Similarity Calculator 13]

Similarity calculator 13 calculates similarities between the first phase difference calculated by phase difference calculator 11 and the second phase differences stored in phase difference database 12. Note that similarity calculator 13 may further calculate the average of similarities, and may use the averaged similarity.

In the present embodiment, similarity calculator 13 calculates space spectrum $P_\omega(\theta, \varphi)$ which is a similarity between direction vector $d_\omega(\theta, \varphi)$ stored in phase difference database 12 and first correlation-matrix $R_\omega$ calculated by phase difference calculator 11. More specifically, similarity calculator 13 calculates, using Expression 6 below, space spectrum $P_\omega(\theta, \varphi)$ in sound source direction $(\theta, \varphi)$ and at frequency $\omega$.

[Math. 5]

$$P_\omega(\theta,\phi)=d_\omega(\theta,\phi)^H R_\omega d_\omega(\theta,\phi) \quad \text{(Expression 6)}$$

Note that when sound source direction $(\theta, \varphi)$ matches a true value of the sound source direction, space spectrum $P_\omega(\theta, \varphi)$ has a large value.

Accordingly, similarity calculator 13 calculates, for each of all the sound source directions in which sound sources are expected to be present, space spectrum $P_\omega(\theta, \varphi)$ in a frequency band having a component of sound emitted by a sound source, the direction of which is to be estimated.

Then, similarity calculator 13 calculates an average space spectrum which is an average of space spectra $P_\omega(\theta, \varphi)$ calculated for frequencies using Expression 7 below.

[Math. 6]

$$\overline{P}(\theta, \phi) = \frac{1}{N_\omega}\sum_{k=1}^{N_\omega} w_k P_{\omega_k}(\theta, \phi) \quad \text{(Expression 7)}$$

Here, $\{\omega_k:k=1,\ldots,N_\omega\}$ denotes a discrete frequency for averaging, and $w_k$ denotes a frequency weight. A discrete frequency is set in a range from 300 Hz to 3300 Hz. A frequency weight means to use, for example, 100 Hz as an important frequency out of 300 Hz to 3300 Hz. Accordingly, $w_k$ is set according to characteristics of a sound source (speech), the direction of which is to be estimated.

[Peak Searcher 14]

Peak searcher 14 searches for a direction for which the highest similarity is calculated by similarity calculator 13, and estimates the direction searched out to be the sound source direction.

In the present embodiment, peak searcher 14 searches for a sound source direction for which average space spectrum [Math. 7] $\overline{P}(\theta,\phi)$ has the greatest value, as indicated by Expression 8 below.

[Math. 8]

$$(\dot{\theta}, \dot{\phi}) = \underset{\theta,\phi}{\mathrm{argmax}} \overline{P}(\theta, \phi) \quad \text{(Expression 8)}$$

As a search result, peak searcher 14 obtains a sound source direction [Math. 10] $\dot{\theta},\dot{\phi}$ for which average space spectrum [Math. 9] $\overline{P}(\theta,\phi)$ has the greatest value.

[Feature Quantity Calculator 15]

Figure 6:
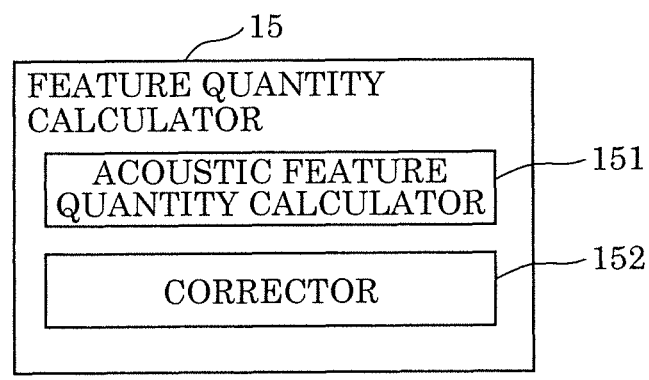
FIG. 6 illustrates an example of a detailed configuration of a feature quantity calculator illustrated in FIG. 5.

FIG. 6 illustrates an example of a detailed configuration of feature quantity calculator 15 illustrated in FIG. 5.

Feature quantity calculator 15 uses at least one of the similarities calculated by similarity calculator 13, a sound source direction estimated by peak searcher 14, and an acoustic feature quantity obtained from an acoustic signal obtained by microphone array 20, to calculate a feature quantity obtained by correcting the acoustic feature quantity.

In the present embodiment, feature quantity calculator 15 includes acoustic feature quantity calculator 151 and corrector 152 as illustrated in FIG. 6.

Acoustic feature quantity calculator 151 calculates an acoustic feature quantity from an acoustic signal obtained by microphone array 20. More specifically, acoustic feature quantity calculator 151 performs calculation to convert, into a frequency domain, acoustic signal $x_m$ obtained by microphone array 20, and obtains a signal converted into the frequency domain as acoustic-feature-quantity $X_{\omega,m}$.

Corrector 152 calculates a feature quantity obtained by correcting an acoustic feature quantity calculated by acoustic feature quantity calculator 151 using a weight based on the sound source direction estimated by peak searcher 14. More specifically, corrector 152 weights the acoustic feature quantity to increase a value of a portion of the acoustic feature quantity with decrease in distance between the portion and the sound source direction estimated by peak searcher 14, based on at least one of the similarities calculated by similarity calculator 13. Corrector 152 calculates feature quantity $S_{l,w}$ obtained by correcting acoustic-feature-quantity $X_{l,\omega}$, using, as a weight, a similarity in which the sound source direction estimated by peak searcher 14 is substituted, as indicated by Expression 9 below.

[Math. 11]

$$S_{l,\omega}=X_{l,\omega,m}P_{\omega,k}(\dot{\theta},\dot{\phi}) \quad \text{(Expression 9)}$$

Here, l denotes a time frame. The reason for introducing a time frame is because features of speech do not clearly appear in a short time period, and thus are averaged per a certain time period.

The more the influence of noise is, the less the value of similarity [Math. 12] $P_{\omega k}(\dot{\theta},\dot{\phi})$ is. Accordingly, in Expression 9, a frequency on which great influence of noise is exerted is weighted so as to have a smaller value. Accordingly, the accuracy of determination by speech/non-speech determiner 16 described below improves.

Note that a certain amount of computation involves for speech/non-speech determiner 16 to perform determination processing by using above feature quantity $S_{l,w}$, and thus a feature quantity obtained by reducing feature quantity $S_{l,w}$ may be used as a feature quantity in order to reduce the amount of computation. The following describes such a case.

Figure 7:
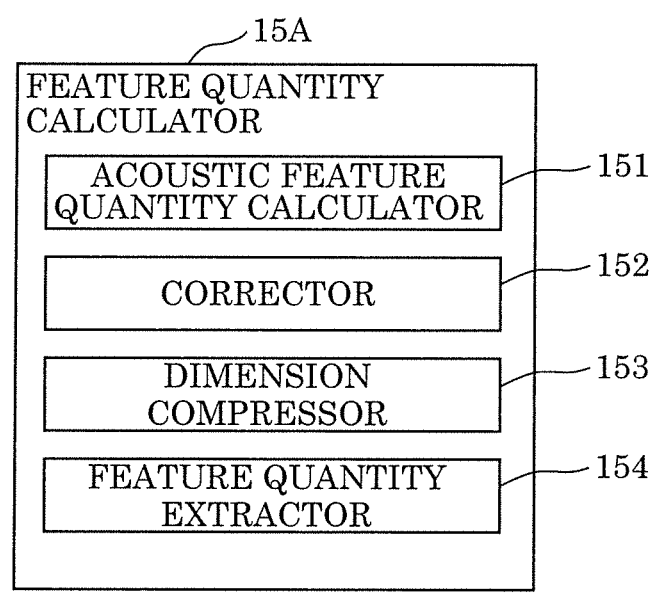
FIG. 7 illustrates an example of a detailed configuration of the feature quantity calculator according to the embodiment.
Figure 8:
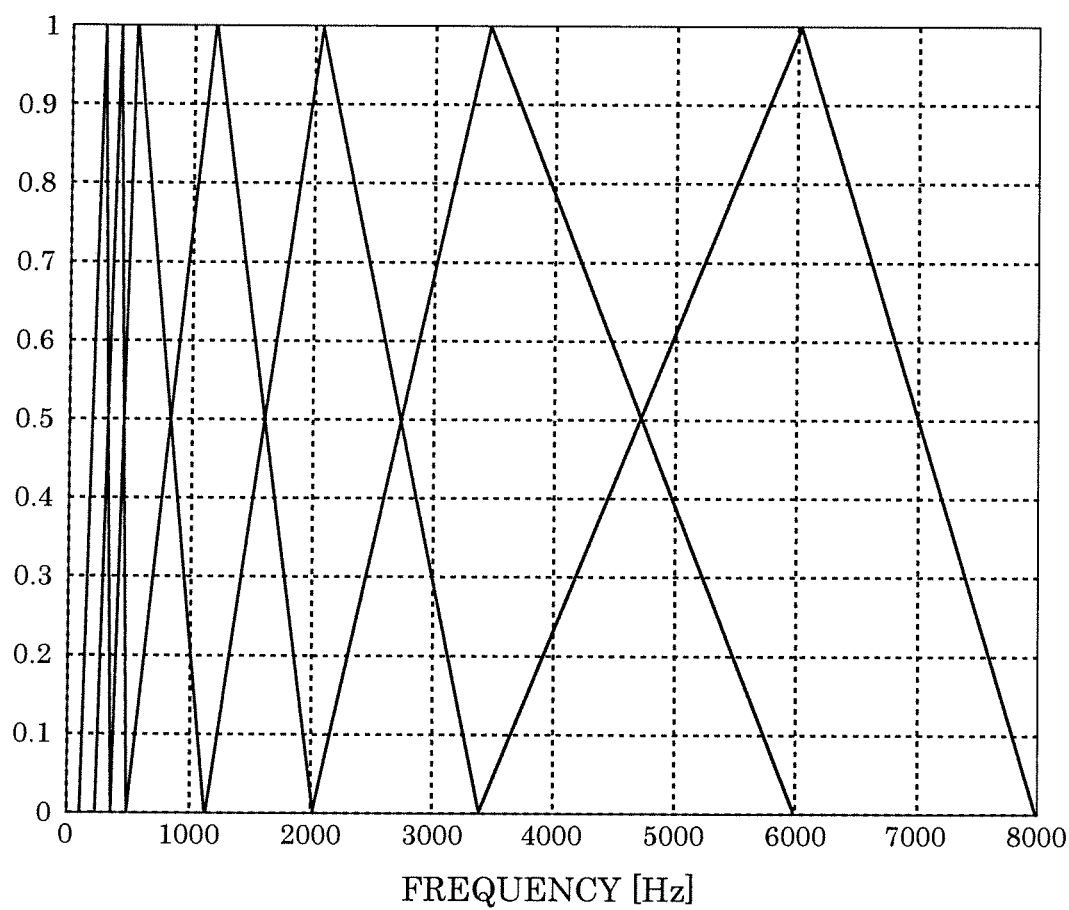
FIG. 8 illustrates an example of a filter bank used by a dimension compressor illustrated in FIG. 7.

FIG. 7 illustrates an example of a detailed configuration of feature quantity calculator 15A in the present embodiment. The same signs are given to the same elements as those in FIG. 6, and thus a detailed description thereof is omitted. FIG. 8 illustrates an example of a filter bank used by dimension compressor 153 illustrated in FIG. 7.

Feature quantity calculator 15A includes acoustic feature quantity calculator 151, corrector 152, dimension compressor 153, and feature quantity extractor 154, as illustrated in FIG. 7. Feature quantity calculator 15A illustrated in FIG. 7 corresponds to feature quantity calculator 15 illustrated in FIG. 6 which additionally includes the configurations of dimension compressor 153 and feature quantity extractor 154.

Dimension compressor 153 compresses the dimension of an acoustic feature quantity weighted by corrector 152, using a mel filter bank. More specifically, dimension compressor 153 compresses the dimension of feature quantity $S_{l,w}$ by applying filter banks indicated by Expressions 10 and 11 below to feature quantity $S_{l,w}$ calculated by corrector 152.

[Math. 13]

$$C_l = [C_{l,1} \ldots C_{l,j}] \quad \text{(Expression 10)}$$

[Math. 14]

$$C_{l,j} = \sum_{k=1}^{N_\omega} a_{j,k} S_{l,k} \quad \text{(Expression 11)}$$

Here, j denotes the order of a filter bank, and $a_{j,k}$ denotes a window function corresponding to the filter bank of a j-th dimension. In the present embodiment, dimension compressor 153 compresses, into seven dimensions, the dimensionality of feature quantity $S_{l,w}$ calculated by corrector 152 using the seven-dimensional mel filter bank illustrated in FIG. 8.

Feature quantity extractor 154 calculates, as a feature quantity, differences between a weighted and compressed acoustic feature quantity and weighted and compressed acoustic feature quantities obtained at discrete time points in the past. More specifically, feature quantity extractor 154 calculates differences between a current acoustic feature quantity and acoustic feature quantities in the past, and uses the differences as a feature quantity, in order to reflect a temporal change in speech. Specifically, feature quantity extractor 154 calculates time-series differences $D_l$ between the calculated filter bank output and filter bank outputs calculated at discrete time points in the past, and uses calculated time-series differences $D_l$ as a feature quantity. Here, filter bank output is $C_l$ indicated by Expression 10, and is feature quantity $S_{l,w}$ to which a filter bank is applied and the dimension of which is compressed.

In the present embodiment, feature quantity extractor 154 calculates time-series differences $D_l$ between the calculated filter bank output and filter bank outputs calculated at separate 6 time points in the past along a time sequence, and uses the differences as feature quantity $D_l$ as indicated by Expression 12 below, for example.

[Math. 15]

$$D_l = [C_l \ C_l - C_{l-1} \ C_l - C_{l-4} \ C_l - C_{l-8} \ C_l - C_{l-16} \ C_l - C_{l-32}] \quad \text{(Expression 12)}$$

Note that filter bank output here has seven dimensions, and thus feature quantity $D_l$ has 42 dimensions. In addition, since the average length of saying one phoneme such as "a" lasts about hundreds of msec, a maximum of 32 time frames (at intervals of 256 msec with a sampling frequency of 16000 Hz and a frame length of 8 msec) are provided.

Thus, feature quantity calculator 15A weights an acoustic feature quantity to increase a value of a portion of the acoustic feature quantity with decrease in distance between the portion and the sound source direction estimated by peak searcher 14, based on at least one of the similarities calculated by similarity calculator 13. Further, feature quantity calculator 15A compresses the dimensionality of the weighted acoustic feature quantity using a mel filter bank, and calculates, as a feature quantity, differences between the weighted and compressed acoustic feature quantity and weighted and compressed acoustic feature quantities obtained at discrete time points in the past. Stated differently, feature quantity calculator 15A calculates feature quantity $D_l$ on which a temporal change in speech is reflected, while compressing the dimensionality of feature quantity $S_{l,w}$ using a filter bank.

Then, calculated feature quantity $D_l$ is used for the speech determination processing by speech/non-speech determiner 16 described below.

[Speech/Non-Speech Determiner 16]

Speech/non-speech determiner 16 is an example of a speech determiner, and determines whether an acoustic signal obtained by microphone array 20 indicates speech, using a feature quantity calculated by feature quantity calculators 15 and 15A. Speech/non-speech determiner 16 may determine whether an acoustic signal obtained by microphone array 20 indicates speech, from a feature quantity calculated by feature quantity calculators 15 and 15A, using a neural network which includes a plurality of layers.

Figure 9:
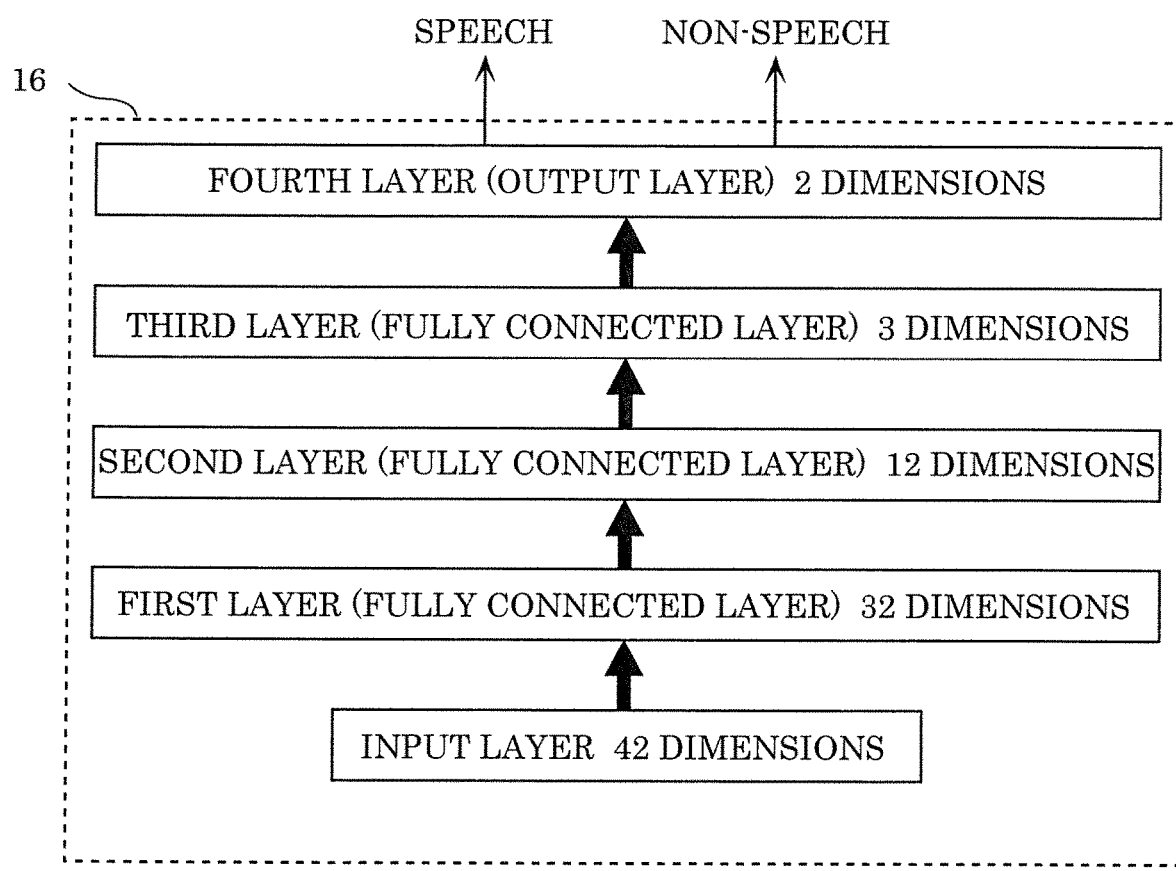
FIG. 9 illustrates an example of a schematic configuration of a neural network used by a Speech/non-speech determiner illustrated in FIG. 5.

In the present embodiment, speech/non-speech determiner 16 determines whether an acoustic signal obtained by microphone array 20 indicates speech, using input of feature quantity $D_l$ calculated by feature quantity calculator 15A and the neural network illustrated in FIG. 9, for example.

FIG. 9 illustrates an example of a schematic configuration of a neural network used by speech/non-speech determiner 16 illustrated in FIG. 5. The neural network illustrated in FIG. 9 includes an input layer, an intermediate layer which includes three fully connected layers, and an output layer which includes a fully connected layer, and ReLU is used as an activation function.

Output $Z_f$ from the f-th layer of the neural network in which ReLU is used as an activation function is calculated using Expression 13 below.

[Math. 16]

$$Z_f = \max(W_f Z_{f-1} + b_f, 0) \quad \text{(Expression 13)}$$

In Expression 13, $W_f$ and $b_f$ denote a weighting factor and a bias term for the f-th layer (f=1, . . . , F) of the neural network, respectively.

Here, feature quantity $D_l$ is input to the neural network illustrated in FIG. 9, and thus the output from the 0-th layer, that is, input layer $Z_0$ is $D_l$. The output layer of the neural network illustrated in FIG. 9 has two dimensions (two units), and each outputs speech or non-speech as a result of the determination. Thus, the neural network illustrated in FIG. 9 has learned to cause one output layer $z_4(1)$ to output 1 when speech is input and to output 0 when non-speech is input as indicated by Expression 14, and causes another output layer $z_4(2)$ to output 0 when speech is input and to output 1 when non-speech is input as indicated by Expression 15.

[Math. 17]

$$z_4(1) = \begin{cases} 1 & \text{SPEECH} \\ 0 & \text{NON-SPEECH} \end{cases} \quad \text{(Expression 14)}$$

[Math. 18]

$$z_4(2) = \begin{cases} 1 & \text{SPEECH} \\ 0 & \text{NON-SPEECH} \end{cases} \quad \text{(Expression 15)}$$

Note that the neural network which speech/non-speech determiner 16 uses to perform determination processing is not limited to the neural network illustrated in FIG. 9. The neural network may further include a pooling layer or a plurality of intermediate layers which have other configurations, or the intermediate layer and the output layer may have any configurations as long as the neural network can learn to cause layers to output the values as indicated by Expressions 14 and 15 above.

[Operation of Sound Source Direction Estimation Device 10]

Operation processing performed by sound source direction estimation device 10 having the configuration as described above is to be described.

Figure 10:
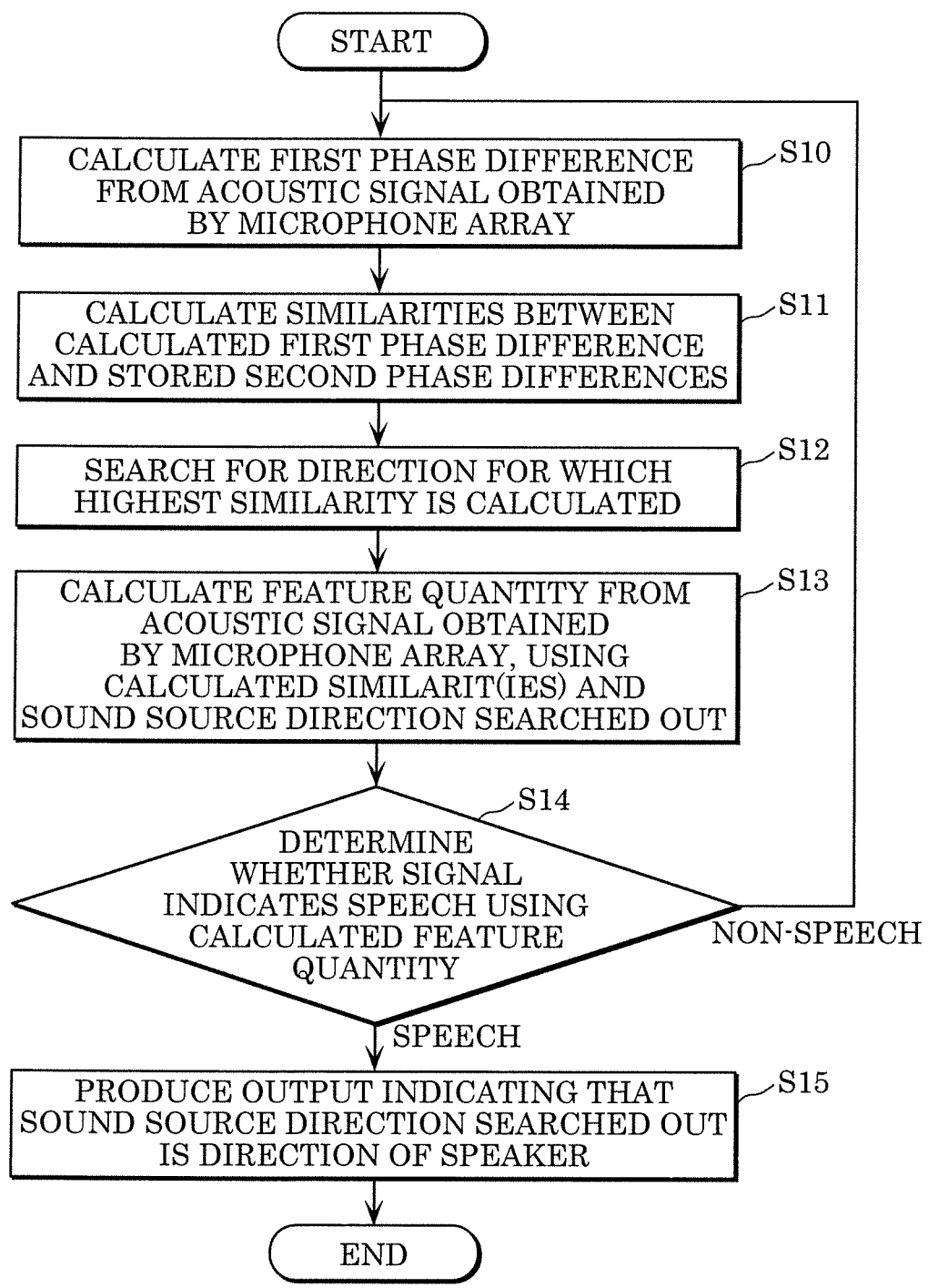
FIG. 10 is a flowchart illustrating operation processing performed by the sound source direction estimation device according to the embodiment.

FIG. 10 is a flowchart illustrating operation processing performed by sound source direction estimation device 10 according to the present embodiment.

First, sound source direction estimation device 10 calculates a first phase difference from an acoustic signal obtained by microphone array 20 (S10). More specifically, sound source direction estimation device 10 calculates a first phase difference of at least one pair of microphone units among at least two microphone units, from an acoustic signal obtained by microphone array 20 which includes the at least two microphone units.

Next, sound source direction estimation device 10 calculates similarities between the calculated first phase difference and stored second phase differences (S11). More specifically, sound source direction estimation device 10 calculates similarities between the first phase difference calculated in step S10 and second phase differences of the at least one pair of microphone units precalculated for directions within a predetermined direction range when sound sources are assumed to be present in the directions.

Next, sound source direction estimation device 10 searches for a direction for which the highest similarity is calculated in step S11 (S12). More specifically, sound source direction estimation device 10 searches for a direction for which the highest similarity is calculated in step S11, and estimates the direction searched out to be a sound source direction.

Next, sound source direction estimation device 10 calculates a feature quantity from an acoustic signal obtained by microphone array 20, using at least one of the calculated similarities and the sound source direction searched out (S13). More specifically, sound source direction estimation device 10 uses at least one of the similarities calculated in step S11, the sound source direction estimated in step S12, and an acoustic feature quantity obtained from the acoustic signal obtained by the microphone array, to calculate a feature quantity obtained by correcting the acoustic feature quantity.

Next, sound source direction estimation device 10 determines whether a signal indicates speech using the feature quantity calculated in step S13 (S14). More specifically, sound source direction estimation device 10 determines whether the acoustic-signal obtained by microphone array 20 indicates speech, using the feature quantity calculated in step S13.

In step S14, when sound source direction estimation device 10 determines that the signal indicates speech (SPEECH in S14), sound source direction estimation device 10 produces output, indicating that the sound source direction searched out in step S12 is the direction of a speaker (S15).

On the other hand, in step S14, when sound source direction estimation device 10 determines that the signal does not indicate speech, that is, indicates non-speech (NON-SPEECH in S14), the processing returns to step S10.

Advantageous Effects

As described above, sound source direction estimation device 10 according to the present embodiment obtains a feature quantity by correcting an acoustic feature quantity using the result obtained by the processing of estimating the sound source direction. Then, by using such a feature quantity for speech determination, whether the acoustic signal indicates speech can be more accurately determined even in a noisy environment while inhibiting an increase in the amount of computation, when compared to the case where an acoustic feature quantity is used. Thus, sound source direction estimation device 10 according to the present embodiment can accurately perform speech determination in a noisy environment, while inhibiting an increase in the amount of computation.

Here, sound source direction estimation device 10 may compress the dimensionality of the calculated feature quantity using a filter bank for the calculated feature quantity, and thereafter may calculate a feature quantity on which a temporal change in speech is reflected. Accordingly, speech determination can be accurately performed in a noisy environment, while further inhibiting an increase in the amount of computation.

Sound source direction estimation device 10 may determine whether an acoustic signal obtained by microphone array 20 indicates speech from the calculated feature quantity, using the neural network which includes a plurality of layers. Accordingly, a neural network can be caused to accurately learn speech determination for a large amount of patterns of feature quantities obtained by correcting acoustic feature quantities according to noisy environments, and thus the accuracy of speech determination in a noisy environment can be further improved.

As described above, sound source direction estimation device 10 can accurately perform speech determination in a noisy environment, and thus the sound source direction, namely, the direction of a speaker when speech determination is performed can be more reliably estimated as a sound source direction. Accordingly, speech translation device 1 which includes sound source direction estimation device 10 can extract speech of a speaker with high quality even in a noisy environment, by directing directivity in the estimated direction of a speaker. As a result, speech translation device 1 which includes sound source direction estimation device 10 yields advantageous effects of more correctly recognizing speech even in a noisy environment and correctly translating the speech.

Variation 1

Figure 11:
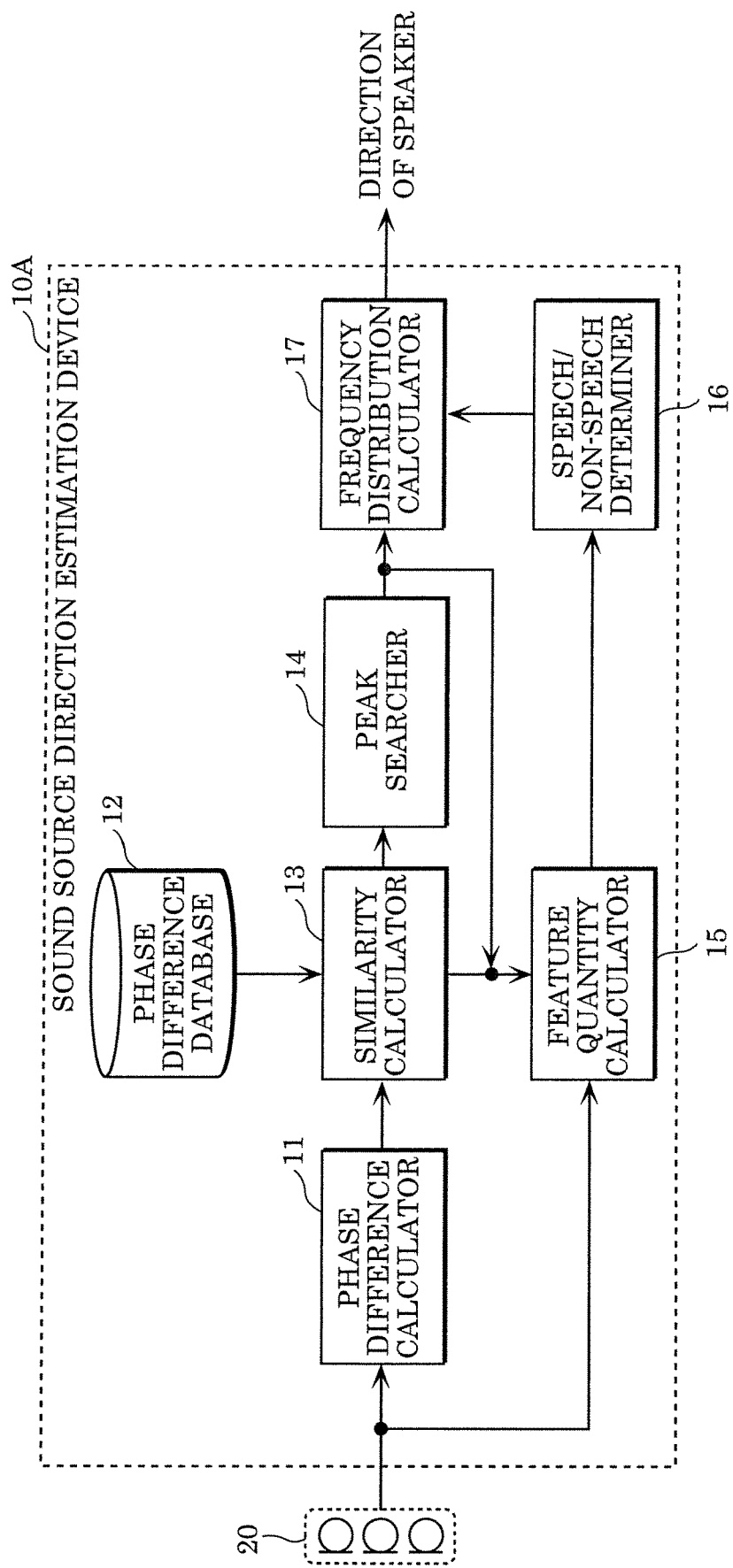
FIG. 11 illustrates an example of a configuration of a sound source direction estimation device according to Variation 1 of the embodiment.

FIG. 11 illustrates an example of a configuration of sound source direction estimation device 10A according to Variation 1 of the present embodiment. The same signs are given to the same elements as those in FIG. 5, and thus a detailed description thereof is omitted.

Sound source direction estimation device 10A is different in configuration from sound source direction estimation device 10 illustrated in FIG. 5 in that frequency distribution calculator 17 is added.

[Frequency Distribution Calculator 17]

Frequency distribution calculator 17 calculates the frequencies of sound source directions estimated by peak searcher 14 in a predetermined period during which speech/non-speech determiner 16 determines that acoustic signals obtained by the microphone array indicate speech. Frequency distribution calculator 17 outputs a sound source direction having a frequency that exceeds a threshold among the calculated frequencies, as a sound source direction truly estimated by sound source direction estimation device 10A.

In this variation, frequency distribution calculator 17 calculates, frequencies of sound source directions, that is, a histogram, from a sound source direction for which the highest similarity is calculated and which is searched out by peak searcher 14 at continuous time points. More specifically, frequency distribution calculator 17 calculates, using Expressions 16 and 17 below, histogram h(θ, φ) in the sound source direction (θ, φ) searched out, from a sound source direction [Math. 20] [$(\hat{\theta}_{l-L+1}, \hat{\phi}_{l-L+1}) \ldots (\hat{\theta}_l, \hat{\phi}_l)$] for which average space spectrum [Math. 19] $\overline{P}(\theta,\phi)$ of acoustic signals for L frames has the greatest value.

[Math. 21]

$$h(\theta, \phi) = \sum_{k=1}^{k=L} m(l - k + 1)$$ (Expression 16)

[Math. 22]

$$m(l) = \begin{cases} 1 & ((\theta, \phi) = (\hat{\theta}_l, \hat{\phi}_l)) \cap (\overline{P}(\hat{\theta}_l, \hat{\phi}_l) > P_{th}) \cap (z_4(1) > z_{th}) \\ 0 & \text{otherwise} \end{cases}$$ (Expression 17)

Here, [Math. 23] $(\hat{\theta}_l, \hat{\phi}_l)$ denotes the sound source direction in time frame 1. $P_{th}$ denotes a threshold of a space spectrum.

Frequency distribution calculator 17 calculates histogram h(θ, ω), using [Math. 25] $\hat{\theta}_l, \hat{\phi}_l$ in a time frame in which average space spectrum [Math. 24] $\overline{P}(\hat{\theta}_l, \hat{\phi}_l)$ is greater than threshold $P_{th}$, the output from output layer $z_4(1)$ is greater than threshold $Z_{th}$, and a signal is determined to indicate speech, as indicated by Expressions 16 and 17. When the value of histogram h(θ, φ) exceeds threshold $L_{th}$, frequency distribution calculator 17 determines the direction at that time to be the sound source direction [Math. 26] $(\hat{\theta}, \hat{\phi})$ which sound source direction estimation device 10A truly estimates, as indicated by Expression 18 below.

[Math. 27]

$$(\hat{\theta}, \hat{\phi}) = \begin{cases} (\theta, \phi) & h(\theta, \phi) \geq L_{th} \\ \{\} & \text{otherwise} \end{cases}$$ (Expression 18)

Note that when the value of histogram h(θ, φ) does not exceed threshold $L_{th}$, frequency distribution calculator 17 does not necessarily determine a sound source direction which sound source direction estimation device 10A estimates, and may maintain the direction undetermined.

Advantageous Effects

As described above, sound source direction estimation device 10A according to this variation can more reliably estimate the direction of speech which is the direction of a speaker as the sound source direction, by calculating a histogram of sound source directions searched out by peak searcher 14 in a period during which signals are determined to include speech.

Accordingly, speech translation device 1 which includes sound source direction estimation device 10A can extract speech of a speaker with high quality even in a noisy environment, by directing directivity in the estimated direction of the speaker. As a result, this yields advantageous effects that speech translation device 1 which includes sound source direction estimation device 10 can recognize speech more correctly even in a noisy environment, and can correctly translate the speech.

Variation 2

Figure 12:
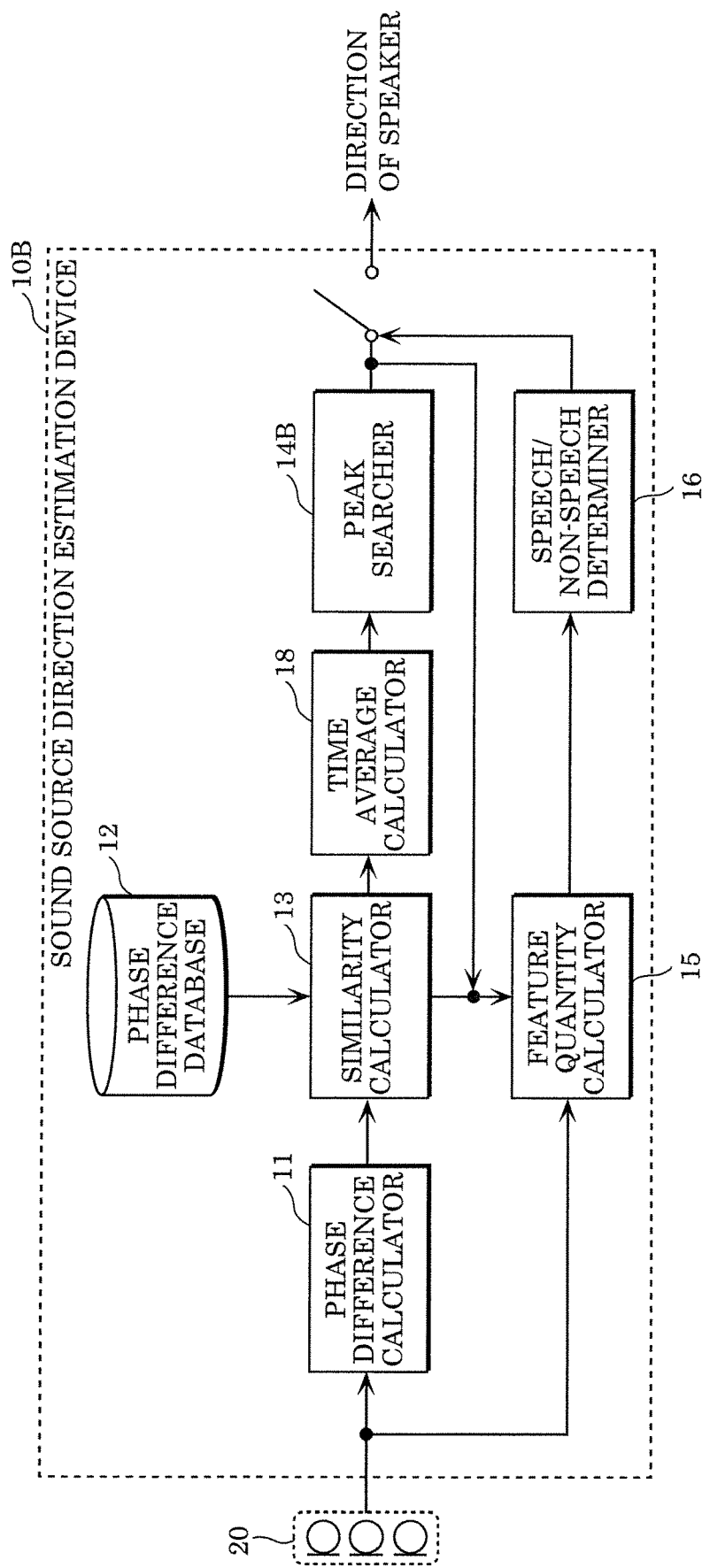
FIG. 12 illustrates an example of a configuration of a sound source direction estimation device according to Variation 2 of the embodiment.

FIG. 12 illustrates an example of a configuration of sound source direction estimation device 10B according to Variation 2 of the present embodiment. The same signs are given to the same elements as those in FIG. 5, and thus a detailed description thereof is omitted.

Sound source direction estimation device 10B is different from sound source direction estimation device 10 illustrated in FIG. 5 in that time average calculator 18 is added and in the configuration of peak searcher 14B. The following mainly describes the differences.

[Time Average Calculator 18]

Time average calculator 18 obtains similarities at time points calculated by similarity calculator 13, and calculates, per predetermined period, a time-averaged similarity. Specifically, in this variation, time average calculator 18 calculates, per predetermined period, an average of similarities in the predetermined period calculated by similarity calculator 13.

A first phase difference in a short time period may reflect a phase in a silent time in speech. Specifically, in this case, irrespective of the speech determination processing on a portion of a speech section, a signal may not be determined to indicate speech, and the accuracy of speech determination may deteriorate.

In view of this, speech tends to last for a comparatively long time, and furthermore a speaker is present closer to sound source direction estimation device 10A than a noise source in the vicinity and speaks in a specific direction. Accordingly, when a time-averaged similarity is used, the first phase difference reflects a speech time which includes no sound, and thus the accuracy of speech determination for a speech section improves.

[Peak Searcher 14B]

Peak searcher 14B searches for a direction for which the highest time-averaged similarity is calculated by time average calculator 18, as the direction for which the highest similarity is calculated.

Advantageous Effects

As described above, sound source direction estimation device 10B according to Variation 2 estimates the sound source direction when speech is determined to be indicated, to be the speech direction which is a direction of a speaker using a time-averaged similarity, and thus can more reliably estimate the speech direction.

Accordingly, speech translation device 1 which includes sound source direction estimation device 10B can extract speech of a speaker with high quality even in a noisy environment, by directing directivity in the estimated direction of the speaker. As a result, speech translation device 1 which includes sound source direction estimation device 10B yields advantageous effects of more correctly recognizing speech even in a noisy environment, and correctly translating the speech.

The above has described, for instance, a sound source direction estimation device according to one or more aspects of the present disclosure, based on the embodiments and variations thereof, yet the present disclosure is not limited to such embodiments and variations. The scope of the present disclosure includes embodiments resulting from various modifications which may be conceived by those skilled in the art to the embodiments, or embodiments achieved by combining elements in different embodiments, as long as the modifications and combinations do not depart from the spirit of the present disclosure. For example, the cases as follows are also included in the present disclosure.

(1) Specifically, the sound source direction estimation device, for instance, may be achieved by a computer system which includes a microprocessor, ROM, RAM, a hard disk unit, a display, a keyboard, a mouse, and the like. A computer program is stored in the RAM or the hard disk unit. The operation of the microprocessor in accordance with the computer program allows each element to achieve its functionality. Here, the computer program includes a combination of instruction codes indicating instructions to a computer in order to achieve predetermined functionality.

(2) Some or all of elements included in the sound source direction estimation device, for instance, described above may be achieved by a single system large scale integration (LSI: large scale integrated circuit). The system LSI is a super multi-function LSI manufactured by integrating multiple components in one chip, and is specifically a computer system configured so as to include a microprocessor, ROM, RAM, and so on. A computer program is stored in the RAM. The system LSI accomplishes its functionality by the microprocessor operating in accordance with the computer program.

(3) Some or all of elements included in the sound source direction estimation device, for instance, described above may be achieved by an IC card or a single module which can be attached to or detached from various devices. The IC card or the module is a computer system which includes a microprocessor, ROM, RAM, and the like. The above supermultifunctional LSI may be achieved by the IC card or the module. The IC card or the module accomplishes its functionality by the microprocessor operating in accordance with the computer program. The IC card or the module may have tamper resistant properties.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for a direction estimation device, a direction estimation method, and a recording medium therefor which are used in, for instance, a speech translation device used as a tool for speakers of different languages to communicate with one another.

What is claimed is:

1. A sound source direction estimation device, comprising:
a phase difference calculator which calculates, from an acoustic signal obtained by a microphone array which includes at least two microphone units, a first phase difference of at least one pair of microphone units among the at least two microphone units;
a similarity calculator which calculates similarities between the first phase difference calculated by the phase difference calculator and second phase differences of the at least one pair of microphone units precalculated for directions within a predetermined direction range when sound sources are assumed to be present in the directions, the second phase differences being stored in a phase difference database;
a peak searcher which searches for a direction for which a highest similarity of the similarities is calculated by the similarity calculator, and estimates the direction searched out to be a sound source direction;
a feature quantity calculator which uses at least one of the similarities calculated by the similarity calculator, the sound source direction estimated by the peak searcher, and an acoustic feature quantity obtained from the acoustic signal obtained by the microphone array, to calculate a feature quantity obtained by correcting the acoustic feature quantity; and
a speech determiner which determines whether the acoustic signal obtained by the microphone array indicates speech, using the feature quantity calculated by the feature quantity calculator.

2. The sound source direction estimation device according to claim 1, further comprising:
a time average calculator which obtains a plurality of sets of the similarities at time points calculated by the similarity calculator, and calculates, per predetermined period, a time-averaged similarity by averaging similarities in the predetermined period among the plurality of sets of the similarities at the time points, wherein
the peak searcher searches for a direction for which a highest time-averaged similarity of the time-averaged similarities is calculated by the time average calculator, as the direction for which the highest similarity is calculated.

3. The sound source direction estimation device according to claim 1, wherein
the speech determiner determines whether the acoustic signal obtained by the microphone array indicates speech, from the feature quantity calculated by the feature quantity calculator, using a neural network which includes a plurality of layers.

4. The sound source direction estimation device according to claim 1, wherein
the feature quantity calculator weights the acoustic feature quantity to increase a value of a portion of the acoustic feature quantity with decrease in distance between the portion and the sound source direction estimated by the peak searcher, based on at least one of the similarities calculated by the similarity calculator, compresses dimensionality of the acoustic feature quantity weighted using a mel filter bank, and calculates, as the feature quantity, differences between (i) the acoustic feature quantity weighted and compressed and (ii) weighted and compressed acoustic feature quantities obtained at discrete time points in past.

5. The sound source direction estimation device according to claim 1, further comprising:
a frequency distribution calculator which calculates frequencies of a plurality of the sound source directions estimated by the peak searcher in a predetermined period during which the speech determiner determines that a plurality of the acoustic signals obtained by the microphone array indicate speech, and outputs, among the plurality of sound source directions, a sound source direction having a frequency that exceeds a threshold among the frequencies calculated, as a sound source direction truly estimated by the sound source direction estimation device.

6. A sound source direction estimation method, comprising:
(a) calculating, from an acoustic signal obtained by a microphone array which includes at least two microphone units, a first phase difference of at least one pair of microphone units among the at least two microphone units;

(b) calculating similarities between the first phase difference calculated in (a) and second phase differences of the at least one pair of microphone units precalculated for directions within a predetermined direction range when sound sources are assumed to be present in the directions, the second phase differences being stored in a phase difference database;

(c) searching for a direction for which a highest similarity of the similarities is calculated in (b), and estimating the direction searched out to be a sound source direction;

(d) using at least one of the similarities calculated in (b), the sound source direction estimated in (c), and an acoustic feature quantity obtained from the acoustic signal obtained by the microphone array, to calculate a feature quantity obtained by correcting the acoustic feature quantity; and (e) determining whether the acoustic signal obtained by the microphone array indicates speech, using the feature quantity calculated in (d).

7. A non-transitory computer-readable recording medium having a program recorded thereon for causing a computer to execute:

(a) calculating, from an acoustic signal obtained by a microphone array which includes at least two microphone units, a first phase difference of at least one pair of microphone units among the at least two microphone units;

(b) calculating similarities between the first phase difference calculated in (a) and second phase differences of the at least one pair of microphone units precalculated for directions within a predetermined direction range when sound sources are assumed to be present in the directions, the second phase differences being stored in a phase difference database;

(c) searching for a direction for which a highest similarity of the similarities is calculated in (b), and estimating the direction searched out to be a sound source direction;

(d) using at least one of the similarities calculated in (b), the sound source direction estimated in (c), and an acoustic feature quantity obtained from the acoustic signal obtained by the microphone array, to calculate a feature quantity obtained by correcting the acoustic feature quantity; and (e) determining whether the acoustic signal obtained by the microphone array indicates speech, using the feature quantity calculated in (d).

* * * * *